(12) United States Patent
Kitano et al.

(10) Patent No.: US 9,810,297 B2
(45) Date of Patent: Nov. 7, 2017

(54) HYDRAULIC AUTO-TENSIONER FOR ENGINE ACCESSORY

(71) Applicant: NTN CORPORATION, Osaka (JP)

(72) Inventors: Satoshi Kitano, Shizuoka (JP);
Tsuyoshi Fukahori, Shizuoka (JP);
Aisaku Satomura, Shizuoka (JP);
Masayoshi Yamada, Shizuoka (JP)

(73) Assignee: NTN CORPORATION, Osaka (JP)

( * ) Notice: Subject to any disclaimer, the term of this patent is extended or adjusted under 35 U.S.C. 154(b) by 175 days.

(21) Appl. No.: 14/435,192

(22) PCT Filed: Oct. 11, 2013

(86) PCT No.: PCT/JP2013/077777
§ 371 (c)(1),
(2) Date: Apr. 13, 2015

(87) PCT Pub. No.: WO2014/061593
PCT Pub. Date: Apr. 24, 2014

(65) Prior Publication Data
US 2015/0252878 A1 Sep. 10, 2015

(30) Foreign Application Priority Data

Oct. 16, 2012 (JP) .................................. 2012-228899
Nov. 21, 2012 (JP) .................................. 2012-255028
Dec. 4, 2012 (JP) .................................. 2012-265196

(51) Int. Cl.
*F16H 7/08* (2006.01)
*F16H 7/12* (2006.01)

(52) U.S. Cl.
CPC ......... *F16H 7/0836* (2013.01); *F16H 7/0848* (2013.01); *F16H 7/1236* (2013.01);
(Continued)

(58) Field of Classification Search
CPC ........ F16H 7/12; F16H 7/0836; F16H 7/0848; F16H 7/1236; F16H 2007/0806;
(Continued)

(56) References Cited

U.S. PATENT DOCUMENTS 5,087,225 A  2/1992  Futami et al.
5,713,809 A  2/1998  Yamamoto et al.
(Continued)

FOREIGN PATENT DOCUMENTS

JP      3-69348    7/1991
JP      10-9350    1/1998
(Continued)

OTHER PUBLICATIONS

Extended European Search Report dated Feb. 12, 2016 in corresponding European Patent Application No. 13847837.5.
(Continued)

*Primary Examiner* — William E Dondero
*Assistant Examiner* — Robert T Reese
(74) *Attorney, Agent, or Firm* — Wenderoth, Lind & Ponack, L.L.P.

(57) ABSTRACT

A hydraulic auto-tensioner for an engine accessory is provided where a sleeve fit-in hole is formed at an upper surface of a bottom portion of a cylinder accommodating a hydraulic oil, a lower end portion of a sleeve is press-fitted in the sleeve fit-in hole, and a lower end portion of a rod is slidably inserted in the sleeve to define a pressure chamber inside the sleeve. A lower end face of the sleeve is in abutment with a divided bottom surface of the sleeve fit-in hole to trap burrs produced when the lower end portion of the sleeve is press-fitted into the sleeve fit-in hole between the divided bottom surface of the sleeve fit-in hole and the lower end face of the sleeve, so that burrs are prevented from mixing into the hydraulic oil.

18 Claims, 14 Drawing Sheets

(52) U.S. Cl.
CPC ............... *F16H 2007/0806* (2013.01); *F16H 2007/0814* (2013.01); *F16H 2007/0859* (2013.01); *F16H 2007/0893* (2013.01)

(58) Field of Classification Search
CPC ..... F16H 2007/0814; F16H 2007/0859; F16H 2007/0893
See application file for complete search history.

(56) References Cited

U.S. PATENT DOCUMENTS

| | | | |
|---|---|---|---|
| 5,879,255 A | 3/1999 | Yamamoto et al. | |
| 6,322,468 B1 | 11/2001 | Wing et al. | |
| 2006/0116229 A1* | 6/2006 | Sato | F16H 7/0848 474/110 |
| 2009/0111628 A1 | 4/2009 | Poiret et al. | |
| 2012/0202628 A1 | 8/2012 | Six et al. | |
| 2014/0057748 A1* | 2/2014 | Satomura | F16H 7/1236 474/110 |

FOREIGN PATENT DOCUMENTS

| | | |
|---|---|---|
| JP | 10-026192 | 1/1998 |
| JP | 2000-346151 | 12/2000 |
| JP | 2001-200901 | 7/2001 |
| JP | 2005-233048 | 9/2005 |
| JP | 2006-189072 | 7/2006 |
| JP | 2009-024715 | 2/2009 |
| JP | 2009-85306 | 4/2009 |
| JP | 2009-121526 | 6/2009 |
| JP | 2009-121527 | 6/2009 |
| JP | 2009-150517 | 7/2009 |
| JP | 2009-191863 | 8/2009 |
| JP | 2009-534598 | 9/2009 |
| JP | 2009-275757 | 11/2009 |
| JP | 2010-276152 | 12/2010 |
| JP | 2011-027238 | 2/2011 |
| JP | 2011-149468 | 8/2011 |
| WO | 2008/087900 | 7/2008 |

OTHER PUBLICATIONS

Office Action dated Jul. 5, 2016 in corresponding Japanese Application No. 2012-265196, with partial English translation.
Office Action dated Jul. 5, 2016 in corresponding Japanese Application No. 2012-255028, with partial English translation.
International Search Report dated Dec. 24, 2013 in International (PCT) Application No. PCT/JP2013/077777.
Written Opinion of the International Searching Authority dated Dec. 24, 2013 in International (PCT) Application No. PCT/JP2013/077777 (with English translation).
Decision of Rejection dated Mar. 14, 2017 in Japanese Application No. 2012-265196, with full machine translation and partial human translation.

* cited by examiner (a)

(b)

(c)

HYDRAULIC AUTO-TENSIONER FOR ENGINE ACCESSORY

TECHNICAL FIELD

The present invention relates to a hydraulic auto-tensioner used for tension adjustment of an engine accessory driving belt for driving vehicle engine accessories such as an alternator, a water pump and a compressor of an air-conditioner.

BACKGROUND ART

As shown in FIG. 23, a belt transmission device for transmitting the rotation of a crankshaft of an engine to various engine accessories such as an alternator includes a pulley arm 83 provided on the slack side of a belt 81 so as to be pivotable about a shaft 82, a tension pulley 84 rotatably supported on the pulley arm 83 at its end remote from the shaft 82, and a hydraulic auto-tensioner A configured to apply an adjusting force to the pulley arm 83, thereby biasing the pulley arm 83 in a direction in which the tension pulley 84 is pressed against the belt 81, whereby the tension of the belt 81 is kept constant.

A conventional hydraulic auto-tensioner A used in such a belt transmission device is disclosed in JP 2009-275757A and JP 2009-191863. In such a hydraulic auto-tensioner, a lower part of a rod is slidably inserted in a sleeve upstanding from a bottom surface of a bottomed cylinder accommodating a hydraulic oil to define a pressure chamber in the sleeve. A return spring is incorporated between a spring washer provided at an upper part of the rod and the bottom surface of the cylinder to bias the rod and the cylinder in the direction in which the rod protrudes from the cylinder.

Furthermore, a tubular spring cover that covers an upper part of the return spring is provided at a lower part of the spring washer, and a seal member is mounted in an upper part opening of the cylinder such that its inner periphery is in elastic contact with the outer periphery of the spring cover, thereby defining a sealed reservoir chamber between the cylinder and the sleeve. The reservoir chamber communicates with the pressure chamber through oil passages formed at a bottom portion of the cylinder. A check valve is mounted in a lower end opening of the sleeve so as to close when the pressure in the pressure chamber increases, thereby disconnecting communication between the pressure chamber and the oil passages.

This hydraulic auto-tensioner further includes a coupling piece provided at a lower surface of the cylinder and configured to be pivotally coupled to an engine block, and a coupling piece provided at an upper surface of the spring washer and configured to be coupled to the pulley arm 83 shown in FIG. 23, and is configured such that when a pushing force tending to push the rod into the cylinder is applied from the belt 81 through the tension pulley 84 and the pulley arm 83, the check valve closes, thus causing hydraulic oil sealed in the pressure chamber to flow through a leakage gap defined between the sliding surfaces of the sleeve and the rod to generate a hydraulic damper force in the pressure chamber by the viscous resistance of the hydraulic oil flowing through the leakage gap. The pushing force is thus damped by the hydraulic damper force.

In the hydraulic auto-tensioner described in JP 2009-191863A, the rod includes a valve fit-in hole opened at a lower end thereof and an oil path through which an upper part of the valve fit-in hole communicates with the reservoir chamber. A relief valve is mounted in the valve fit-in hole, and is configured such that a valve body of the relief valve is opened if the pressure in the pressure chamber becomes higher than a set pressure of the relief valve, thereby allowing hydraulic oil in the pressure chamber to flow through the oil path into the reservoir chamber.

In the hydraulic auto-tensioner according to JP 2009-191863A, the pressure in the pressure chamber can be held at a value not exceeding the set pressure of the relief valve, and hence the belt can be prevented from becoming over-tensioned.

In either of the hydraulic auto-tensioners described in JP 2009-275757A and JP 2009-191863A, the sleeve fit-in hole is formed at the bottom surface of the cylinder, and a lower end portion of the sleeve is press-fitted into the sleeve fit-in hole to hold the assembled state. Thus, the interference due to press-fitting is relatively large and the sleeve is press-fitted while rubbing against the sleeve fit-in hole when press-fitting the sleeve, whereby press-fitting burrs may form at the outer peripheral portion of the lower end face of the sleeve by such press-fitting.

In an hydraulic auto-tensioner, the lower end face of the sleeve is positioned at a higher level than the lower surface of the valve seat of the check valve incorporated in the lower end portion of the sleeve, and a gap is formed between the lower end face of the sleeve and the bottom surface of the sleeve fit-in hole. Thus, when burrs formed at the time of press-fitting drop, the burrs flow into the oil passages through the gap and mix into and float in the hydraulic oil. Burrs thus may get stuck in the leakage gap or the check valve, inhibiting the damper function when damping the pushing force applied on the hydraulic auto-tensioner.

An object of the present invention is to provide a hydraulic auto-tensioner for use with an engine accessory that prevents press-fitting burrs produced when fitting the sleeve from mixing into the hydraulic oil.

SUMMARY OF THE INVENTION

In order to overcome the above problem, the present invention provides a hydraulic auto-tensioner for use with an engine accessory, comprising: a cylinder containing hydraulic oil and including a bottom portion having an upper surface formed with a sleeve fit-in hole; a sleeve having a lower end portion press-fitted in the sleeve fit-in hole; a rod having a lower end portion slidably inserted in the sleeve and defining a pressure chamber in the sleeve; a return spring incorporated between a spring washer provided at an upper part of the rod and the upper surface of the bottom portion of the cylinder and biasing the cylinder and the rod in a direction in which the rod protrudes from the cylinder; a tubular spring cover provided on the spring washer and covering an upper part of the return spring; a seal member incorporated in an upper side opening of the cylinder and having an inner periphery kept in elastic contact with an outer periphery of the spring cover, thereby defining a reservoir chamber between the cylinder and the sleeve. At least one oil passage is defined between fitting surfaces of the sleeve and the sleeve fit-in hole such that the reservoir chamber communicates with the pressure chamber through the oil passage. A check valve is mounted in the lower end portion of the sleeve and configured to be closed, thereby disconnecting the pressure chamber from the oil passage, when a pressure in the pressure chamber becomes higher than a pressure in the reservoir chamber, and the sleeve has a lower end face in abutment with a bottom surface of the sleeve fit-in hole.

With this arrangement, since the lower end face of the sleeve is in abutment with the bottom surface of the sleeve fit-in hole, any burrs produced when the sleeve is press-fitted are trapped between the lower end face of the sleeve and the bottom surface of the sleeve fit-in hole and is prevented from floating in the hydraulic oil.

This in turn prevents burrs from getting stuck in the leakage gap or the check valve, thus inhibiting the damper function.

In order to bring the lower end face of the sleeve into abutment with the bottom surface of the sleeve fit-in hole, the bottom surface of the sleeve fit-in hole may be stepped so that an outer peripheral portion of the bottom surface is at a more upper (higher) level than an inner peripheral portion of the bottom surface, and the lower end face of the sleeve is in abutment with the outer peripheral portion of the bottom surface. In another arrangement for this purpose, the check valve includes a valve seat having a lower surface located at a higher level than the lower end face of the sleeve, and the bottom surface of the sleeve fit-in surface is a flat surface.

The bottom surface may be stepped by placing an annular washer having a rectangular cross-section on the bottom surface.

The washer may be made of metal, but is preferably a molded article made of synthetic resin to reduce the cost. In this case, since the washer is incorporated to always be immersed in the hydraulic oil, a resin excelling in oil resistance is preferably adopted therefor. Polyamide is preferably used for such resin.

Preferably, the at least one oil passage comprises a plurality of radially extending oil passages, the bottom surface and the inner peripheral surface of the sleeve fit-in hole are divided into a plurality of circumferentially separate bottom surface portions and a plurality of circumferentially separate inner peripheral surface portions, respectively, by the plurality of oil passages, and a pocket having a fan shape in plan view is formed in each of the bottom surface portions. With this arrangement, it is possible to trap even bulky burrs produced when press-fitting the sleeve in the above pockets.

Preferably, each of the separate surface portions of the divided inner peripheral surface of the sleeve fit-in hole has a circumferential width smaller than the circumferential width of the outer peripheral portion of the corresponding one of the fan-shaped pockets so that burrs produced when the sleeve is press-fitted into the sleeve fit-in hole while rubbing against the inner peripheral surface of the sleeve fit-in hole can be reliably trapped in the pockets.

The cylinder is a die casting molded article made of aluminum alloy or an aluminum forged article, so that the stepped bottom surface and the pockets for accommodating burrs can be easily molded at the time of molding. A satisfactory cylinder without casting pores that excels in strength can be obtained by adopting a pore free die casting method (PF die casting method).

In the hydraulic auto-tensioner according to the present invention, by providing a filter on the hydraulic oil flow-in side of a valve hole formed in the check valve, when the rod protrudes from the sleeve under the biasing force of the return spring and the check valve is opened so that hydraulic oil in the reservoir chamber flows into the pressure chamber through the oil passages, the hydraulic oil is filtered by the filter so that if any foreign substances mixed in the hydraulic oil are captured by the filter.

Thus, even if burrs are produced when the sleeve is press-fitted into the sleeve fit-in hole and mixed into the hydraulic oil, such burrs are captured by the filter. This prevents foreign substances such as burrs from flowing into the pressure chamber and getting stuck in the leakage gap or the check valve, which in turn reliably prevents a failure of the hydraulic damper function.

The filter may comprise a net, or may be made of a porous metal or a porous metal referred to as foam metal.

If a filter in the form of a net is used, and if its mesh size is smaller than 0.1 mm, the flowing resistance of hydraulic oil tends to be large and hydraulic oil does not smoothly flow into the pressure chamber from the reservoir chamber, thus making it difficult for the rod to smoothly protrude from the sleeve. If the mesh size is greater than 0.2 mm, burrs, and the like produced when press-fitting the sleeve cannot be captured. Preferably, therefore, the net filter has a mesh size of 0.1 mm to 0.2 mm.

If a filter made of a porous metal is used, its porosity is preferably in the range of 90 to 97% in view of the flowability of hydraulic oil and the capturing property of foreign substances.

As described in JP 2009-191863A, a hydraulic auto-tensioner is known in which an oil path through which the pressure chamber communicates with the reservoir chamber is provided in the rod, and a relief valve is incorporated in the oil path. In such a hydraulic auto-tensioner, which includes the relief valve, if a filter is provided on the hydraulic oil flow-in side of the relief valve, foreign substances such as burrs mixed in the hydraulic oil can be captured with the filter so that foreign substances can be prevented from entering the relief valve. Therefore, the drawback in which foreign substances get stuck in the relief valve does not arise, and the function of the relief valve is not inhibited by foreign substances.

In a hydraulic auto-tensioner including the relief valve, at a lower surface facing the pressure chamber of the valve seat formed with the valve hole of the relief valve, a tapered surface inclined with a rising slope from a middle toward the outer periphery is formed or a truncated conical narrow protrusion in which the cross-sectional shape of the root is an arcuate surface is arranged at the central part of the lower surface, so that when hydraulic oil flows into the oil path through the valve hole formed in the valve seat, foreign substances mixed in the hydraulic oil are guided by the tapered surface or the tapered outer periphery of the narrow protrusion to be easily flowed toward the outer periphery of the valve seat. Foreign substances are less likely to enter the valve hole and the function of the relief valve can be suppressed from being inhibited by foreign substances.

For a valve spring for biasing the valve body of the relief valve toward the valve hole, a conical coil spring in which the end facing the valve body has a small diameter, a hourglass-shaped coil spring in which the central part in the length direction has a small diameter and the diameter becomes larger toward both ends, a disc spring, or a cylindrical coil spring formed by a spring wire having an elliptical cross-sectional shape is adopted, which springs having a large spring constant compared to a cylindrical coil spring, so that the size in the length direction of the valve spring can be reduced and the relief valve can be miniaturized. Thus, a space having a long axial length does not need to be ensured to incorporate the relief valve, and the perforation process with respect to the rod can be facilitated.

EFFECT OF THE INVENTION

As described above, in the present invention, the lower end face of the sleeve is brought into contact with the bottom surface of the sleeve fit-in hole so that the burr produced by the rubbing of the sleeve can be sandwiched between the lower end face of the sleeve and the bottom surface of the sleeve fit-in hole when press-fitting the sleeve. The drawback in which the burr floats in the hydraulic oil and gets caught in the leakage gap and the check valve thus disabling the damper function does not arise, and a hydraulic auto-tensioner having high reliability can be obtained.

BRIEF DESCRIPTION OF THE DRAWINGS

An embodiment of the present invention will be hereinafter described based on the drawings. As shown in FIG. 1, this embodiment includes a cylinder 1 including a bottom portion, and on the lower surface of which bottom portion is arranged a coupling piece 2 to be coupled to an engine block. The cylinder 1 is molded by die casting or forging using aluminum alloy for the material. A cylinder 1 with excellent quality and without casting ports can be obtained by using, as the die casting, a pore free die casting method (PF die casting method).

Figure 1:
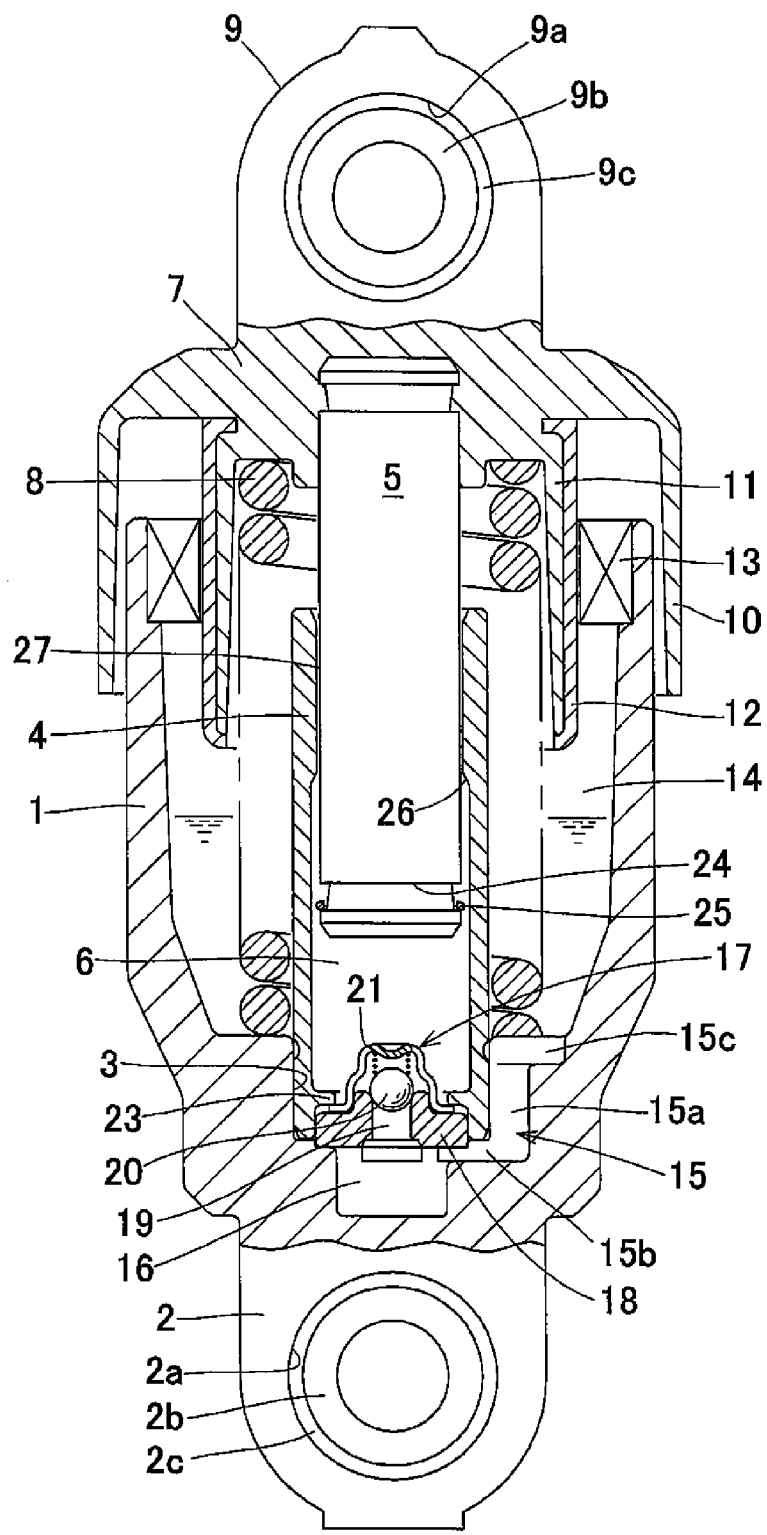
FIG. 1 is a longitudinal sectional view of an embodiment of a hydraulic auto-tensioner for use with an engine accessory according to the present invention.

The coupling piece 2 includes a shaft inserting hole 2a extending therethrough from one to the other side surface thereof. A tubular pivot shaft 2b and a slide bearing 2c rotatably supporting the pivot shaft 2b are mounted in the shaft inserting hole 2. The pivot shaft 2b is fixed in position by tightening a bolt inserted through the pivot shaft 2b and threadedly engaged in the engine block. The pivot shaft 2b thus supports the cylinder 1 so as to be pivotable about the pivot shaft 2b.

A sleeve fit-in hole 3 is formed in the upper surface of the bottom portion of the cylinder 1, and a lower end portion of a sleeve 4 made of steel is press-fitted in the sleeve fit-in hole 3. A rod 5 has its lower portion slidably inserted in the sleeve 4, thus defining a pressure chamber 6 in the sleeve 4.

A spring washer 7 is fixed to an upper end portion of the rod 5 positioned outside the cylinder 1. A return spring 8 is mounted between the spring washer 7 and the bottom surface of the cylinder 1, biasing the cylinder 1 and the rod 5 in the direction in which the rod 5 protrudes from the cylinder 1.

Figure 23:
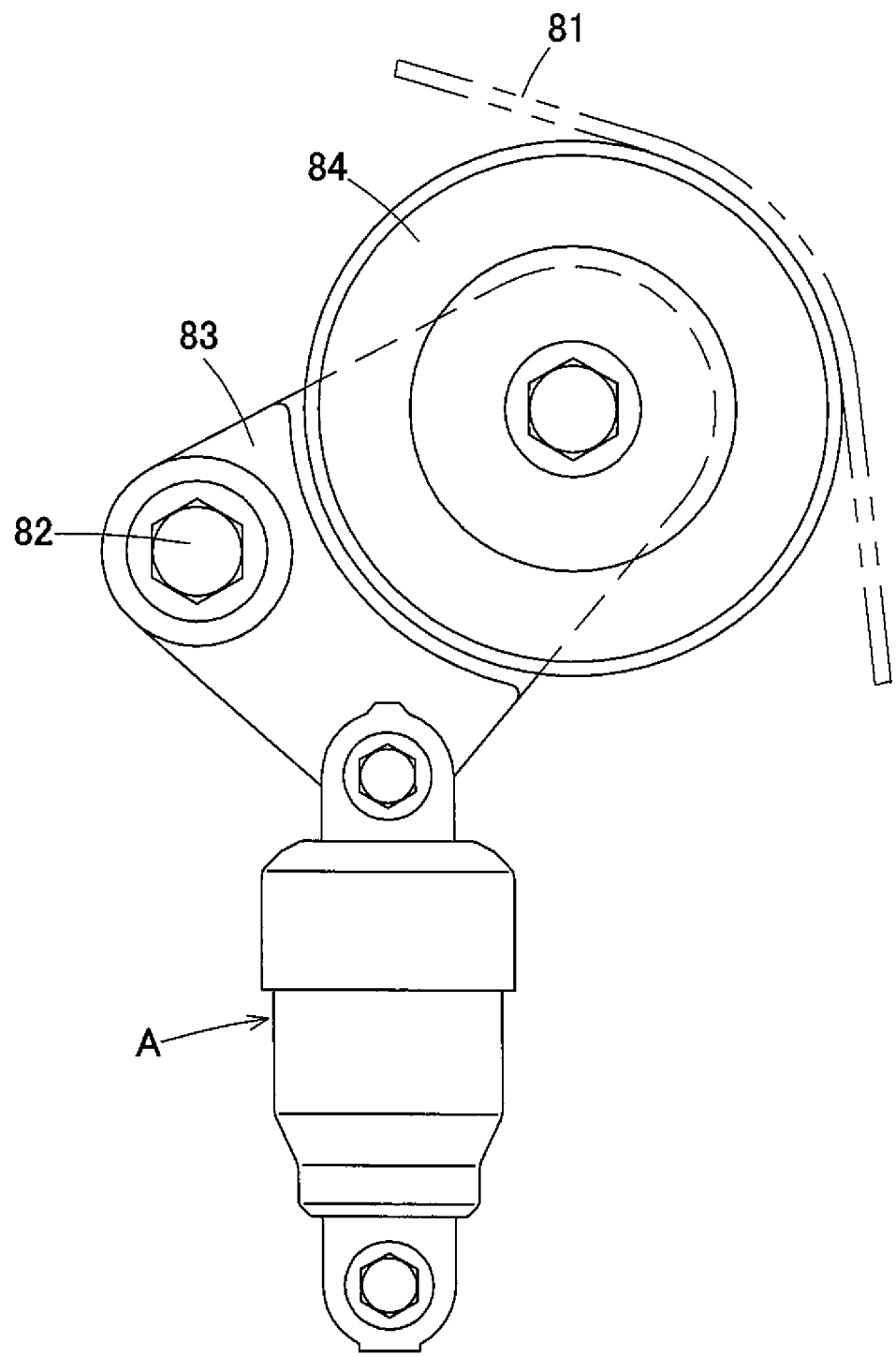
FIG. 23 is a front view of a tension adjustment device for adjusting the tension of an engine accessory driving belt.

The spring washer 7 has at its top end a coupling piece 9 to be coupled to the pulley arm 83 shown in FIG. 23. The coupling piece 9 is formed with a sleeve inserting hole 9a extending therethrough from one to the other side surface thereof. A sleeve 9b and a slide bearing 9c rotatably supporting the sleeve 9b are mounted in the sleeve inserting hole 9a. The coupling piece 9 is rotatably coupled to the pulley arm 83 by a bolt inserted through the sleeve 9b.

The spring washer 7 is formed by molding. When forming the spring washer 7 by molding, a tubular dust cover 10 that covers the outer circumference of the upper part of the cylinder 1 and a tubular spring cover 11 that covers the upper part of the return spring 8 are simultaneously formed by molding so as to be integral with the spring washer 7.

The spring washer 7 may be formed by die-casting an aluminum alloy or by molding a resin such as a thermosetting resin.

The spring cover 11 has the entire outer circumference covered by a tubular member 12 which is inserted in the spring washer 7 when molding the spring washer 7. The tubular member 12 is formed by pressing a steel plate.

An oil seal 13 as a seal member is fitted in the upper side opening of the cylinder 1 such that the inner periphery of the oil seal 13 is in elastic contact with the outer peripheral surface of the tubular member 12 to close the upper side opening of the cylinder 1, thus preventing hydraulic oil in the cylinder 1 from leaking to outside and preventing entry of dust.

A sealed reservoir chamber 14 is defined between the cylinder 1 and the sleeve 4 by the oil seal 13. The reservoir chamber 14 and the pressure chamber 6 communicate with each other by way of a plurality of oil passages 15 defined between the fitting surfaces of the sleeve fit-in hole 3 and the sleeve 4, and an oil sump 16 in the form of a circular recess formed in the bottom surface of the sleeve fit-in hole 3 at its central portion.

Figure 2:
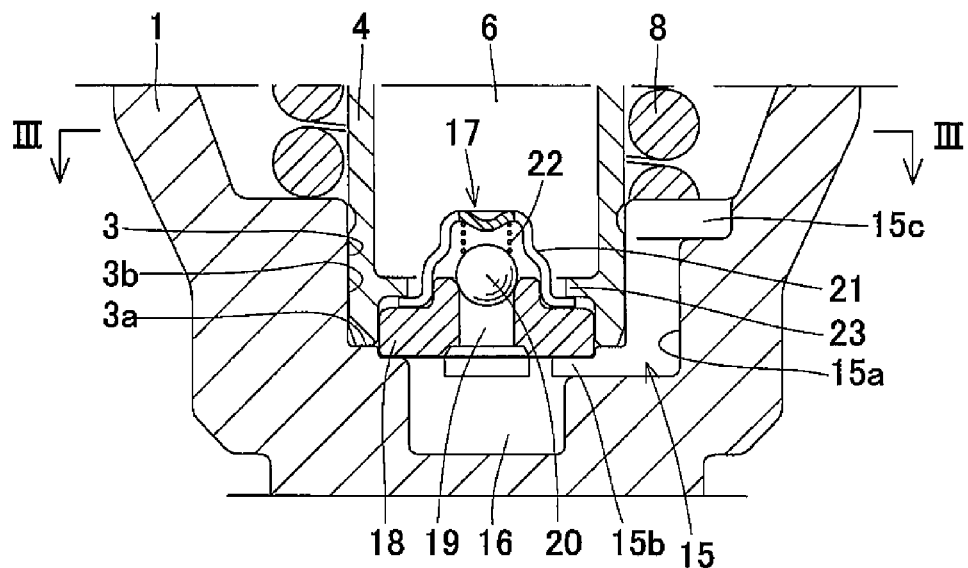
FIG. 2 is an enlarged sectional view of a portion of FIG. 1.
Figure 3:
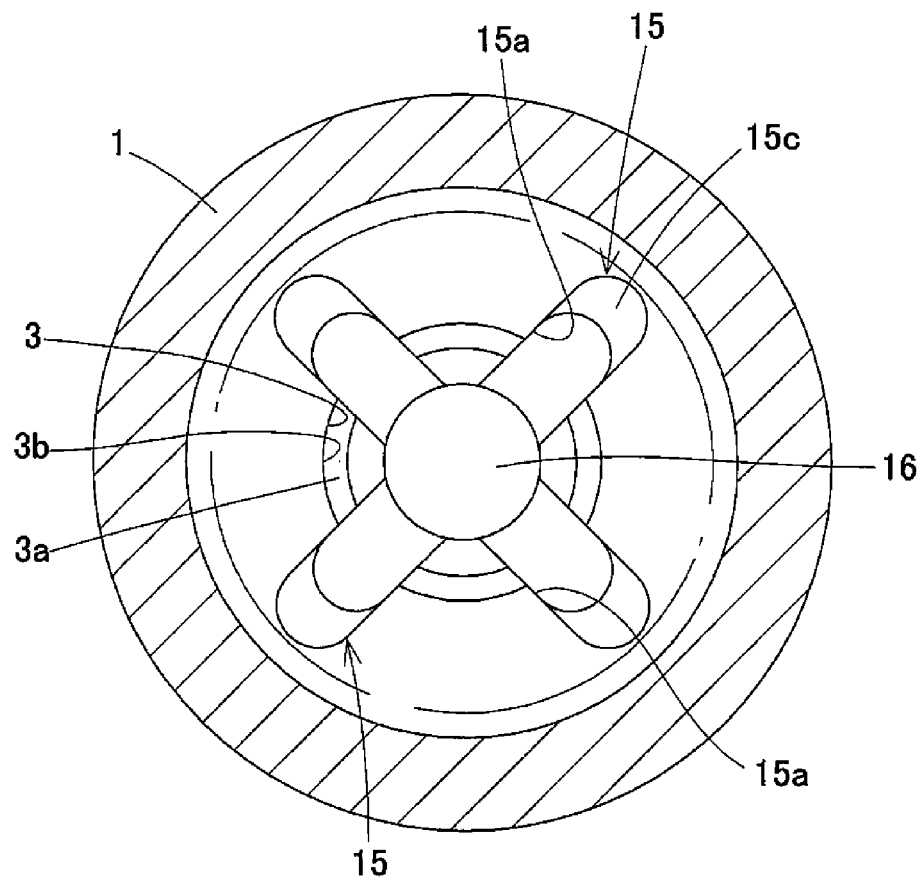
FIG. 3 is a sectional view of a cylinder, taken along line of FIG. 2.

As shown in FIGS. 2 and 3, each oil passage 15 includes an axial groove 15a, and a radial groove 15b extending radially inward from the lower end of the axial groove 15a and communicating with the oil sump 16. The upper side opening 15c of each axial groove 15a has the shape of a radially outwardly extending elongated hole.

In the embodiment, there are four of the oil passages 15 arranged to form a cross in plan view such that the bottom surface 3a and the inner peripheral surface 3b of the sleeve fit-in hole 3 are divided into four separate surface portions, respectively, by the oil passages 15.

As shown in FIG. 2, a check valve 17 is mounted in the lower end portion of the sleeve 4. The check valve 17 includes a valve seat 18 having a valve hole 19, a check ball 20 that opens and closes the valve hole 19 of the valve seat 18 from the pressure chamber 6 side, a valve retainer 21 that restricts the stroke of the check ball between the open and closed positions, and a valve spring 22 that biases the check ball 20 toward the valve hole 19.

The check valve 17 is configured such that when the pressure in the pressure chamber 6 becomes higher than the pressure in the reservoir chamber 14, the check ball 20 closes the valve hole 19 and disconnects the pressure chamber 6 from the oil passages 15 thus preventing hydraulic oil in the pressure chamber 6 from flowing into the reservoir chamber 14 through the oil passages 15.

Figure 4:
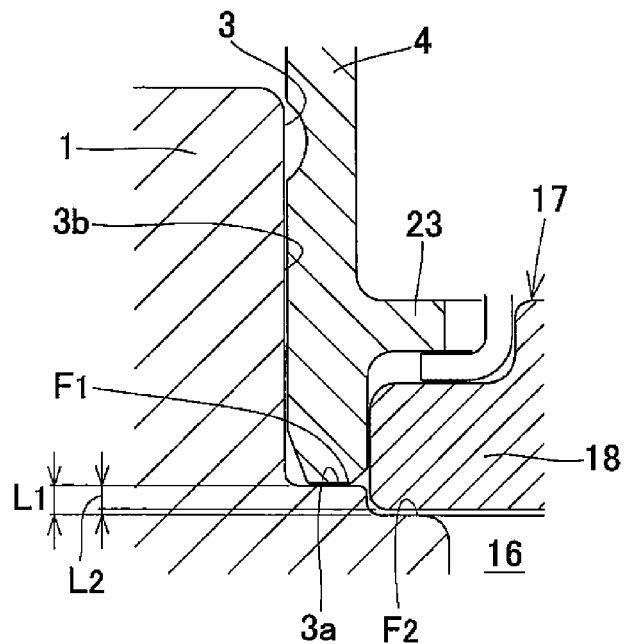
FIG. 4 is an enlarged sectional view of a sleeve fit-in portion of FIG. 2.

As shown in FIGS. 2 and 4, the check valve 17 is axially positioned by a positioning flange 23 arranged at a lower part of the inner periphery of the sleeve 4 such that the lower surface of the valve seat 18 is located at a lower level than the lower end face of the sleeve 4. The divided bottom surface 3a of the sleeve fit-in hole 3 is stepped such that the outer peripheral surface portion $F_1$ thereof is located at a higher level than the inner peripheral surface portion $F_2$, and the difference in height $L_1$ between the portions $F_1$ and $F_2$ is greater than the protruding length $L_2$ of the portion of the valve seat 18 protruding from the lower end face of the sleeve 4, so that the sleeve 4 is in abutment at its lower end surface with the outer peripheral surface portion $F_1$ of the divided bottom surface 3a.

As shown in FIG. 1, the rod 5 is formed with a ring groove 24 at the lower end portion thereof, which is positioned in the sleeve 4. A snap ring 25 is fitted in the ring groove 24 and configured to prevent the rod 5 from being pulled out of the sleeve 4 by making contact with a step portion 26 formed at the upper part of the inner periphery of the sleeve 4.

The amount of the hydraulic oil sealed in the cylinder 1 is determined to be equal to or greater than 40% of the volume of the internal space of the tensioner when the rod 5 protrudes from the cylinder 4 to the limit, i.e. until the snap ring 25 abuts the step portion 26.

In order to adjust the tension of the engine accessory driving belt 81 shown in FIG. 23 using the hydraulic auto-tensioner of the embodiment, the coupling piece 2 provided at the closed end of the cylinder 1 is coupled to the engine block, and the coupling piece 9 of the spring washer 7 is coupled to the pulley arm 83, to apply an adjustment force to the pulley arm 83.

In this state, the tension of the belt 81 changes due to e.g. fluctuations in loads of the engine accessory. When the tension of the belt 81 is decreasing, the cylinder 1 and the rod 5 are moved relative to each other in the direction in which the rod 5 protrudes from the cylinder 1under the biasing force of the return spring 8 to absorb slackening of the belt 81.

When the cylinder 1 and the rod 5 are moved relative to each other in the direction in which the rod 5 protrudes from the cylinder 1, the pressure in the pressure chamber 6 becomes lower than the pressure in the reservoir chamber 14, and thus the check ball 20 of the check valve 17 opens the valve hole 19. Hydraulic oil in the reservoir chamber 14 thus smoothly flows through the valve hole 19 and the oil passages 15 into the pressure chamber 6, and the cylinder 1 and the rod 5 are smoothly moved relative to each other in the direction in which the rod protrudes from the cylinder, thus immediately absorbing slackening of the belt 81.

When the tension of the belt 81 is increasing, a pushing force that tends to push the rod 5 of the hydraulic auto-tensioner into the cylinder 1 is applied from the belt 81. Due to the pushing force, the pressure in the pressure chamber 6 becomes higher than the pressure in the reservoir chamber 14, and thus the check ball 20 of the check valve 17 closes the valve hole 19.

Furthermore, hydraulic oil in the pressure chamber 6 flows through a leakage gap 27 defined between the radially inner surface of the sleeve 4 and the radially outer surface of the rod 5 and then flows into the reservoir chamber 14, and a hydraulic damper force is generated in the pressure chamber 6 due to the viscous resistance of the hydraulic oil flowing through the leakage gap 27. The hydraulic damper pressure damps the pushing force applied on the hydraulic auto-tensioner, allowing the cylinder 1 and the rod 5 to be slowly moved relative to each other in the direction in which the rod 5 is pushed into the cylinder to the position where the pushing force and the elastic force of the return spring 8 are balanced.

The hydraulic auto-tensioner shown in FIG. 1 is maintained in the assembled state by press-fitting the lower end portion of the sleeve 4 in the sleeve fit-in hole 3, and thus the interference between the sleeve 4 and the sleeve fit-in hole 3 is relatively large. This means that the sleeve 4 is fitted into the hole 3 while rubbing against the peripheral surface of the sleeve fit-in hole 3. This could result in the formation of burrs. If such burrs drop from the lower end face of the sleeve 4 and mix into and/or float in the hydraulic oil, they may get stuck in the leakage gap 27 or the check valve 17 thus inhibiting the damper function when, as described above, damping the pushing force applied on the hydraulic auto-tensioner.

In the embodiment, as shown in FIG. 2, the sleeve 4 has the lower end face thereof in abutment with the upper-level, outer peripheral surface portion of the divided bottom surfaces 3a of the sleeve fit-in hole 3, so that any burrs that may form when the sleeve 4 is press-fitted into the sleeve fit-in hole 3 are trapped between the lower end face of the sleeve 4 and the bottom surface of the sleeve fit-in hole 3.

This prevents the hydraulic damper function from being inhibited by burrs that may form when fitting the sleeve 4.

Figure 5:
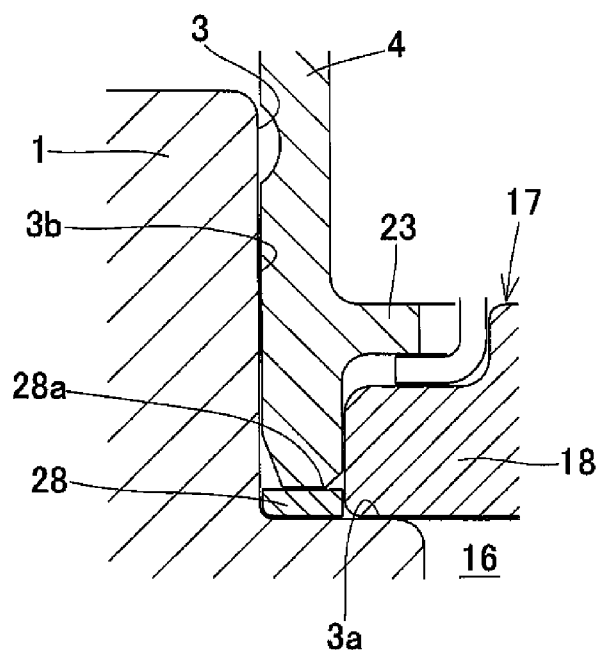
FIG. 5 is a sectional view showing another example of the formation of a stepped bottom surface of a sleeve fit-in hole.

In FIG. 4, the upper-level, outer peripheral surface portion F1 is defined by the step formed on the bottom surface itself of the sleeve fit-in hole 3. In FIG. 5, the divided bottom surface 3a of the sleeve fit-in hole 3 is a flat surface, and the upper-level, outer peripheral surface portion is defined by the upper surface 28a of an annular washer 28 placed on the outer peripheral portion of the flat divided bottom surface 3a.

The washer 28 may be made of metal, or may be a molded article made of synthetic resin excelling in oil resistance, such as polyamide. If the washer 28 is a molded article made of synthetic resin, the cost can be reduced.

Figure 6:
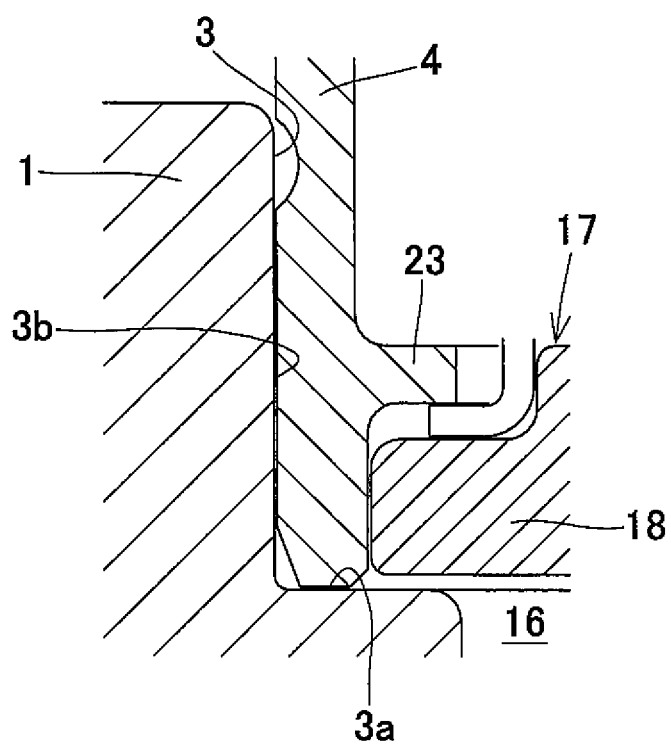
FIG. 6 is a sectional view showing another example of a press-fitting burr sealing means.

In FIG. 4, the bottom surface of the sleeve fit-in hole 3 is stepped and the lower end face of the sleeve 4 is brought into contact with the upper-level, outer peripheral surface portion of the bottom surface of the sleeve fit-in hole 3. In FIG. 6, the valve seat 18 of the check valve 17 is mounted such that the lower surface thereof is positioned at a higher level than the lower end face of the sleeve 4, and the sleeve fit-in hole 3 has a flat divided bottom surface 3a, whereby the lower end surface of the sleeve 4 abuts the bottom surface 3a of the sleeve fit-in hole 3.

Figure 7:
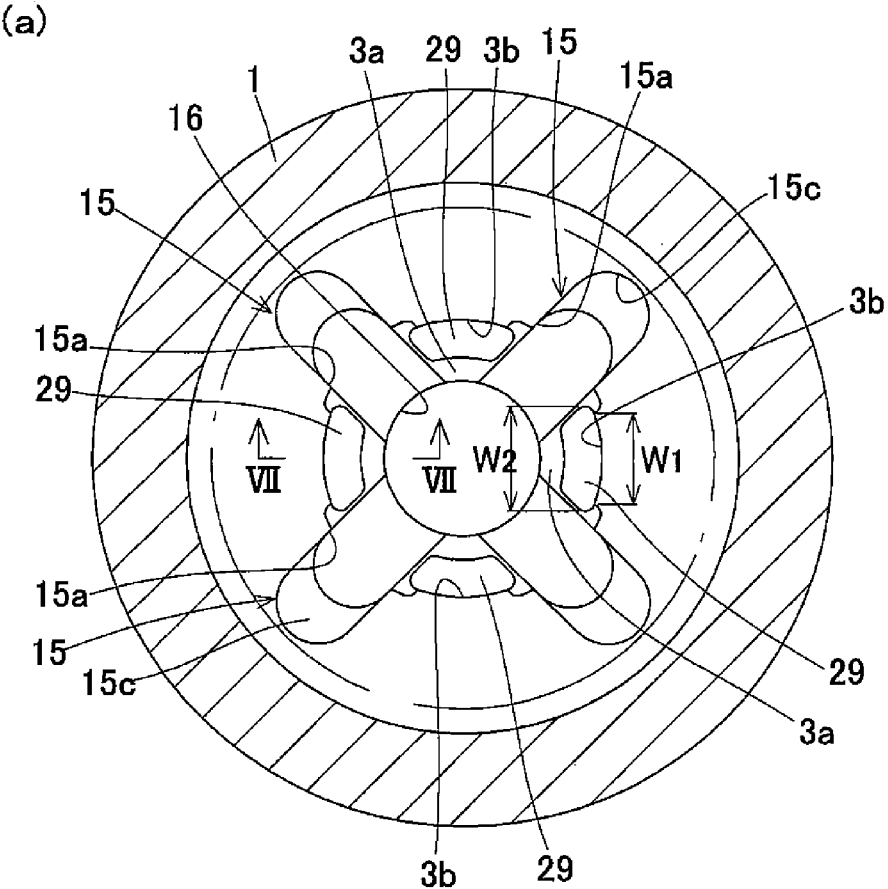
FIG. 7(a) is a cross-sectional view showing another example of a press-fitting burr sealing means.
FIG. 7(b) is a sectional view taken along line VII-VII of FIG. 7(a)
FIG. 7(c) is a perspective view of FIG. 7(a).
Figure 7:
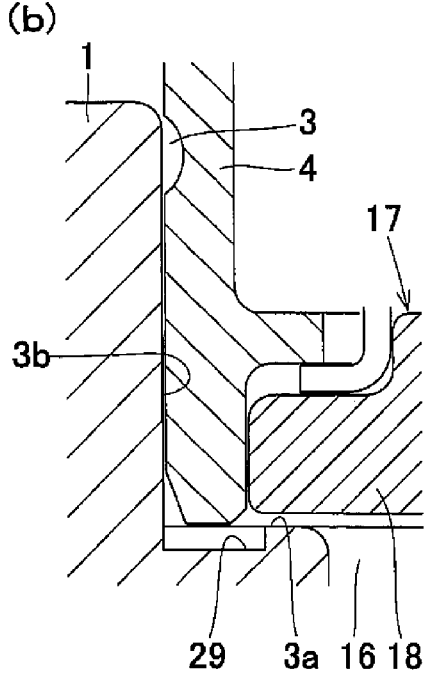
Figure 7:
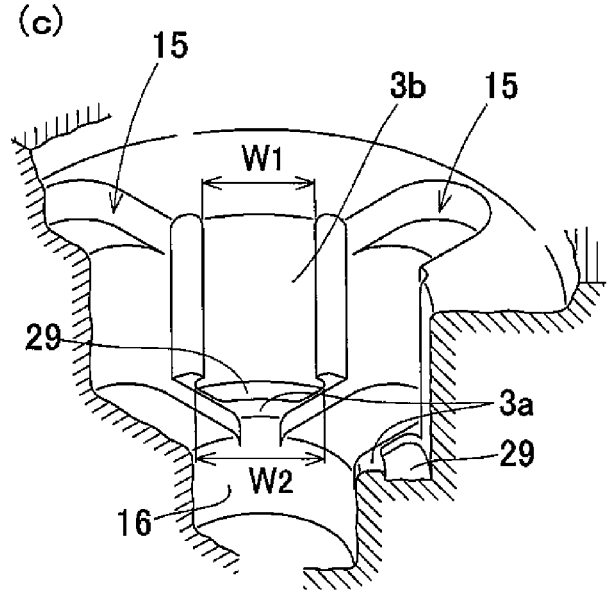

In this case, as shown in FIGS. 7(a) to 7(c), a arc-shaped (in plan view) pocket 29 is preferably formed in each of the separate surface portions of the divided bottom surface 3a so that even bulky burrs can be trapped in the pockets 29.

In this arrangement, each of the separate surface portions of the divided inner peripheral surface 3b of the sleeve fit-in hole 3 has preferably a circumferential width $W_1$ smaller than the circumferential width $W_2$ of the outer peripheral portion of the corresponding one of the arc-shaped pockets 29 so that burrs produced when the sleeve 4 is press-fitted into the sleeve fit-in hole 3 while rubbing against the divided inner peripheral surface 3b can be reliably trapped in the pockets 29.

Figure 8:
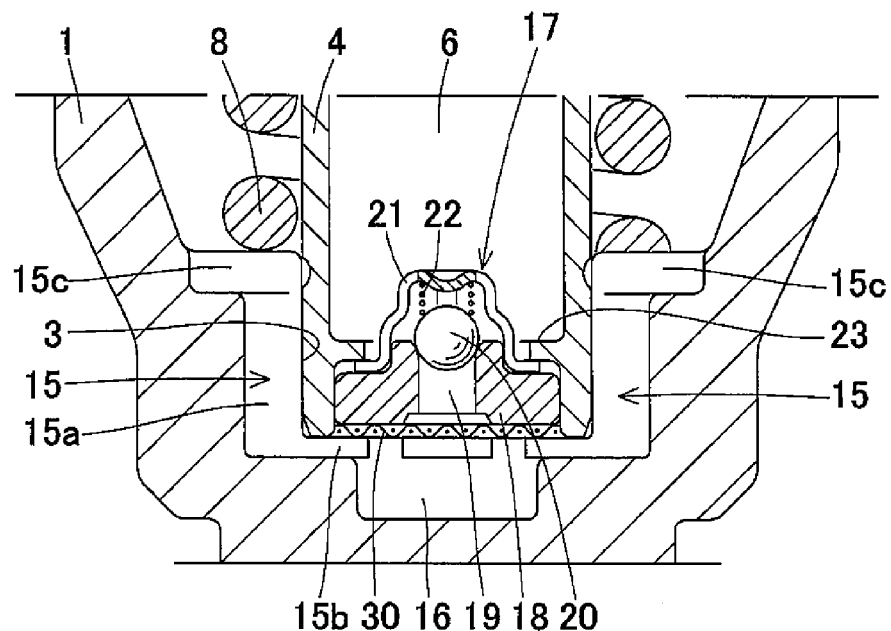
FIG. 8 is a longitudinal cross-sectional view of an embodiment of a hydraulic auto-tensioner for use with an engine accessory according to the present invention.

FIG. 8 shows another embodiment of a hydraulic auto-tensioner according to the present invention. In the present embodiment, a filter 30 is incorporated on the hydraulic oil flow-in side of the valve hole 19 formed in the valve seat 18. The filter 30 is a flat net made of SUS metal and has a mesh size of 0.1 mm to 0.2 mm. The filter 30 is sandwiched between, and supported by, the lower surface of the valve seat 18 and the bottom surface of the sleeve fit-in hole 3.

As shown in FIG. 8, by providing the filter 30 on the hydraulic oil flow-in side of the valve hole 19 formed in the valve seat 18 of the check valve 17, when the rod 5, shown in FIG. 1, protrudes from the sleeve 4 under the biasing force of the return spring 8, the check valve 17 is opened, so that hydraulic oil in the reservoir chamber 14 flows through the oil passages 15 into the oil sump 16, and then into the valve hole 19 through the filter 30. Hydraulic oil is filtered by the filter 30, that is, any foreign substances mixed in the hydraulic oil are captured by the filter 30.

Thus, even if burrs are produced and mixed in the hydraulic oil when the sleeve 4 is press-fitted into the sleeve fit-in hole 3, such burrs are captured by the filter 30. This arrangement prevents foreign substances such as burrs from flowing into the pressure chamber 6 and getting stuck in the leakage gap 27 or the check valve, thus reliably preventing a failure of the hydraulic damper function.

Figure 9:
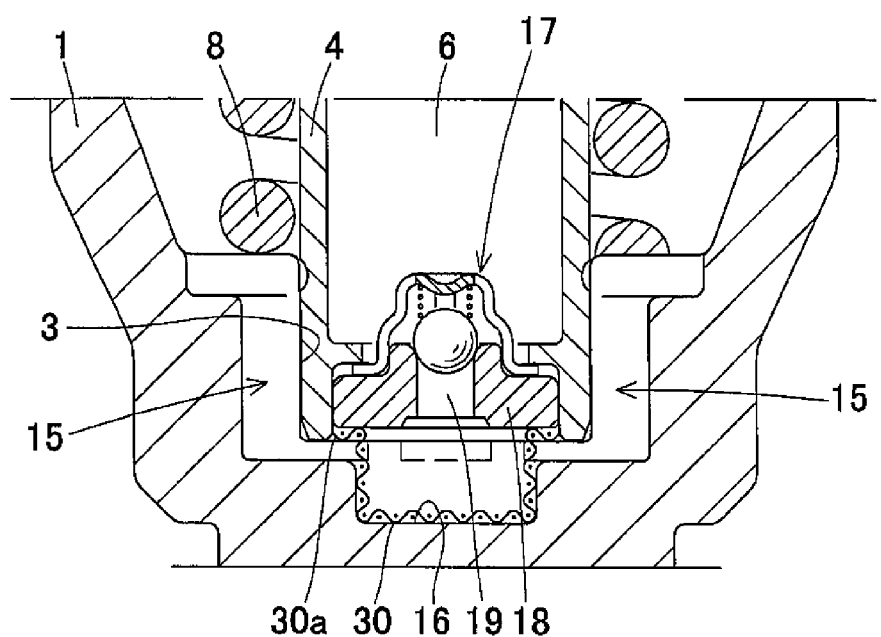
FIG. 9 is a sectional view showing another example of a filter.

The filter 30 is a flat net in FIG. 8, but may be a non-flat net. For example, as shown in FIG. 9, the filter may be a cup-shaped member received in the oil sump 16 and having an outwardly extending flange 30a provided at the open end thereof and sandwiched between the lower surface of the valve seat 18 and the bottom surface of the sleeve fit-in hole 3.

Figure 10:
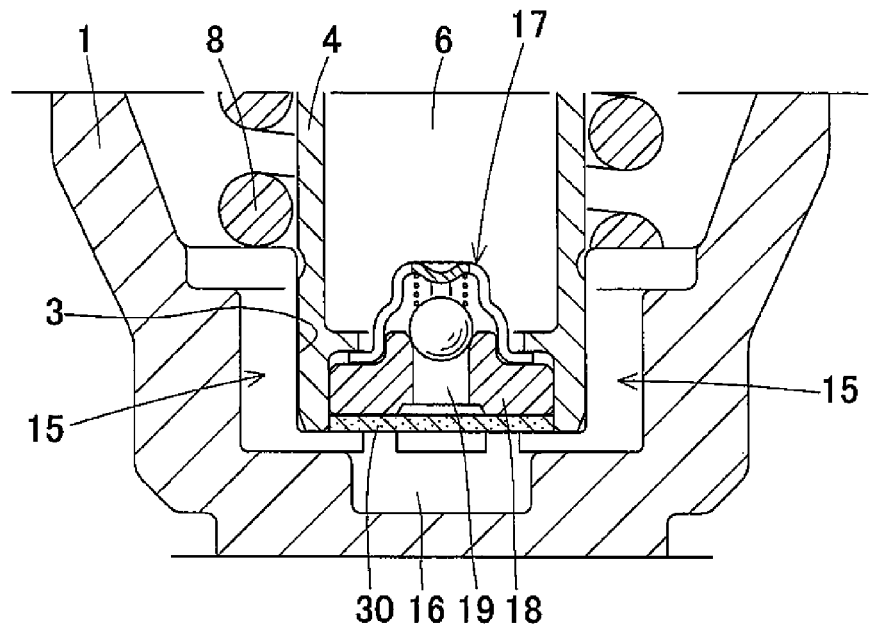
FIG. 10 is a sectional view showing another example of a filter.
Figure 11:
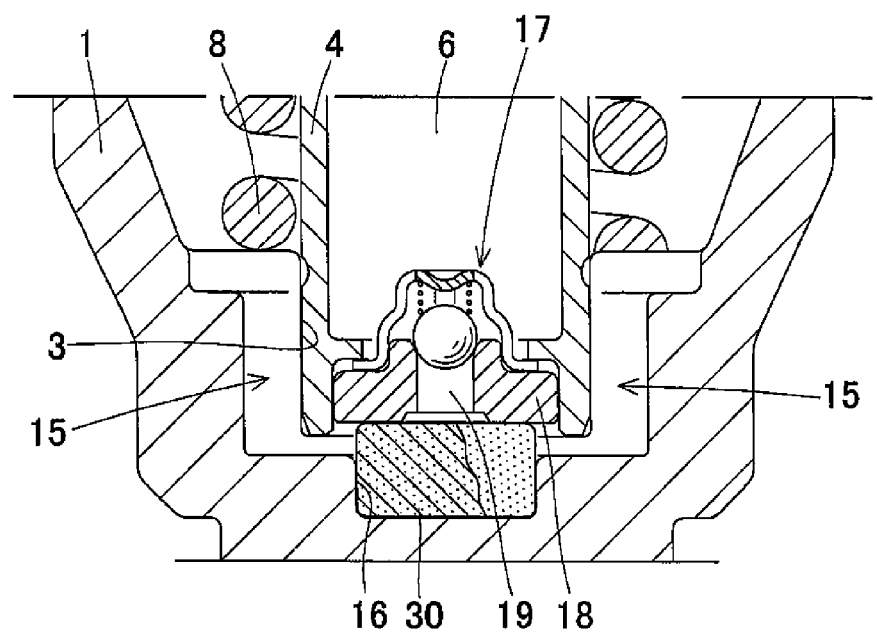
FIG. 11 is a sectional view showing another example of a filter.

The filter 30 is not limited to a net. The filters 30 shown in FIGS. 10 and 11 are porous metal members of which the porosity is in a range of 90 to 97%. The filter 30 shown in FIG. 10 is a sheet-like member sandwiched between the lower surface of the valve seat 18 and the bottom surface of the sleeve fit-in hole 3. The filter 30 shown in FIG. 11 is a circular columnar block received in the oil sump 16 and sandwiched between the bottom surface of the oil sump 16 and the lower surface of the valve seat 18.

Figure 12:
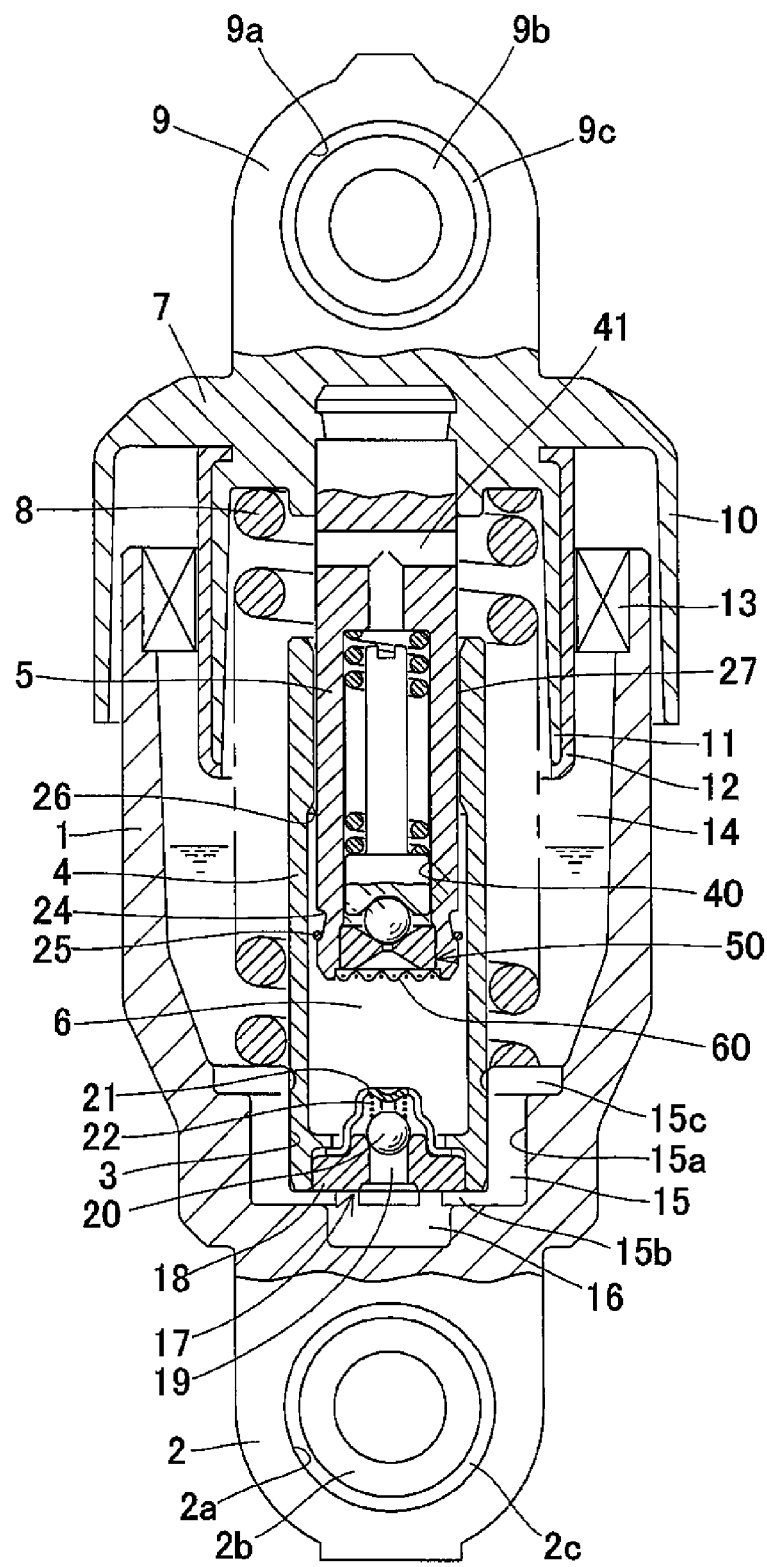
FIG. 12 is a longitudinal sectional view of still another embodiment of a hydraulic auto-tensioner for use with an engine accessory according to the present invention.

FIG. 12 shows still another embodiment of a hydraulic auto-tensioner for use with an engine accessory. This embodiment differs from the hydraulic auto-tensioner shown in FIG. 1 in that the rod 5 is formed with a valve fit-in hole 40 opened at the lower end face thereof, and a T-shaped oil path 41 that communicates the upper part of the valve fit-in hole 40 to the reservoir chamber 14, that a relief valve 50 is incorporated in the valve fit-in hole 40, and that a filter 60 is provided on the hydraulic oil flow-in side of the relief valve 50. Thus, elements identical to those of the hydraulic auto-tensioner shown in FIG. 1 are denoted by identical reference numerals, and the description thereof will be omitted.

Figure 13:
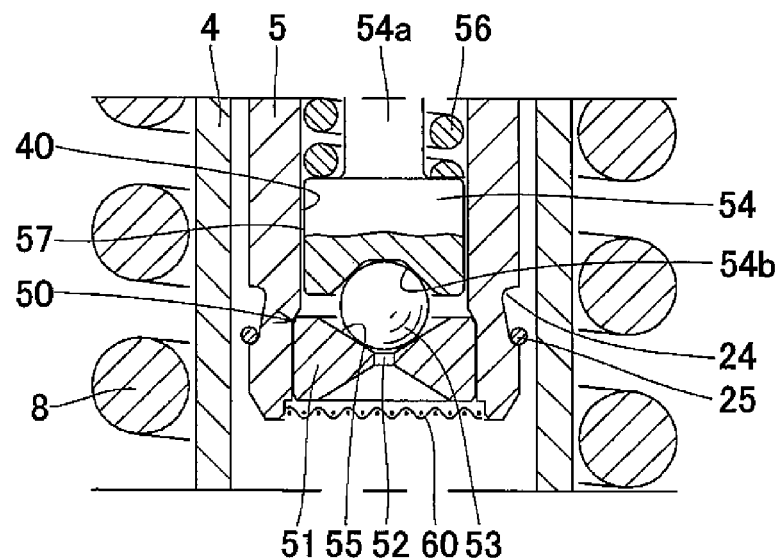
FIG. 13 is an enlarged sectional view of a portion of FIG. 12 where a relief valve is mounted.

As shown in FIG. 13, the relief valve 50 includes a valve seat 51 press-fitted in the lower end opening of the valve fit-in hole 40, a spherical valve body 53 that opens and closes a valve hole 52 formed in the valve seat 51 from inside the valve fit-in hole 40, a spring seat 54 provided on the upper side of the valve body 53, and a valve spring 56 that biases the valve body 53 toward a seat surface 55 formed on the upper surface of the valve seat 51 through the spring seat 54.

The spring seat 54 has a circular column shape, and is slidable along the radially inner surface of the valve fit-in hole 40. A gap 57 is defined between the sliding surfaces of the spring seat 54 and the valve fit-in hole 40.

A rod 54a is arranged in the valve spring 56 so as to be integral with the upper surface of the spring seat 54. The spring seat 54 has in its lower surface a conical recess 54b into which the upper part of the valve body 53 is fitted.

The relief valve 50 is configured such that if the pressure in the pressure chamber 6 exceeds the set pressure, which is the elastic force of the valve spring 56, the valve body 53 opens the valve hole 52.

The filter 60 is incorporated on the hydraulic oil flow-in side of the valve hole 52 formed in the valve seat 51. The filter 60 is a flat net made of stainless steel (SUS) and having a mesh size of 0.1 mm to 0.2 mm.

As shown in FIG. 13, by providing the filter 60 on the hydraulic oil flow-in side of the valve hole 52 of the valve seat 51 in the relief valve 50, if the relief valve 50 opens and hydraulic oil in the pressure chamber 6 flows through the oil path 41 into the reservoir chamber 14, the hydraulic oil flows through the filter 60, so that any foreign substances mixed in the hydraulic oil are captured by the filter 60.

This prevents entry of foreign substances into the relief valve 50, and thus prevents a failure of the relief valve 50 due to foreign substances getting stuck in the relief valve 50.

Figure 14:
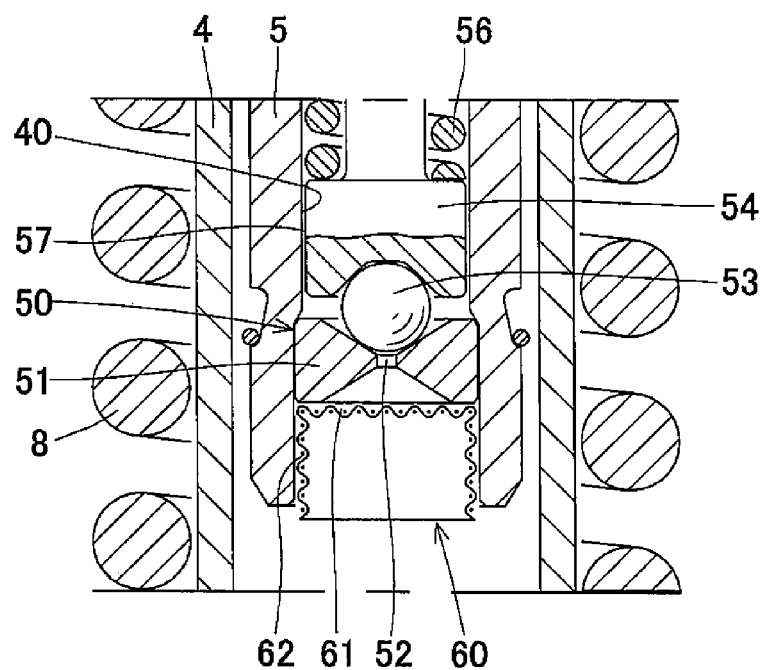
FIG. 14 is a sectional view showing another example of a filter.

The filter 60 is a flat net in FIG. 13, but may be a non-flat net. For example, as shown in FIG. 14, a cup shaped filter may be used which includes a flat net portion 61 in abutment with the lower surface of the valve seat 51, and a cylindrical portion 62 provided on the outer periphery of the flat net portion 61 and fitted to the radially inner surface of the oil path.

Figure 15:
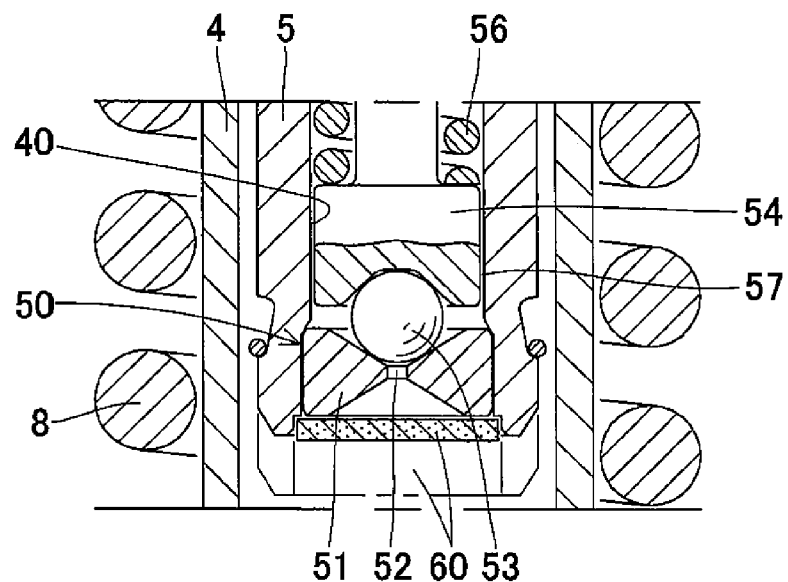
FIG. 15 is a sectional view showing still another example of a filter.

The filter 60 is not limited to a net either. In FIG. 15, the filter 60 is a porous metal member of which the porosity is in a range of 90 to 97%. In FIG. 15, a sheet-like filter 60 is shown, but a circular column shaped filter may be adopted, as shown with a chain line in this figure.

Figure 16:
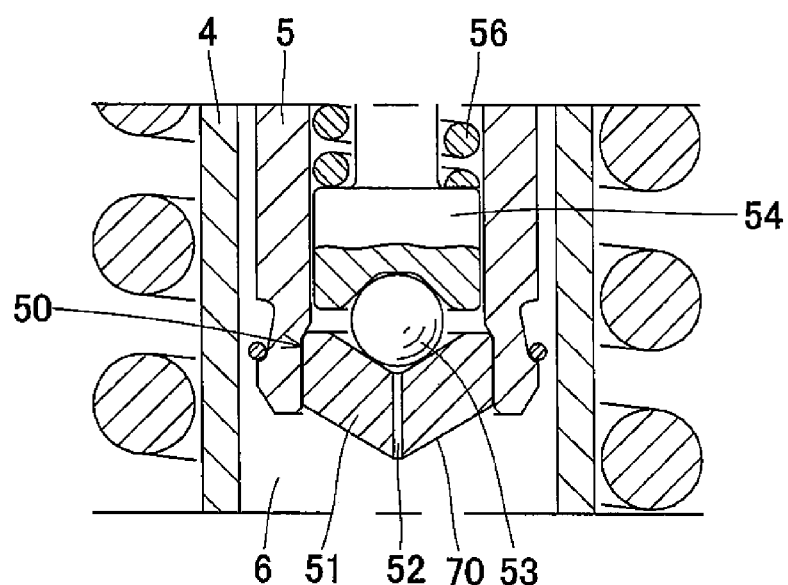
FIG. 16 is a longitudinal sectional view of still another embodiment of a hydraulic auto-tensioner for use with an engine accessory according to the present invention.
Figure 17:
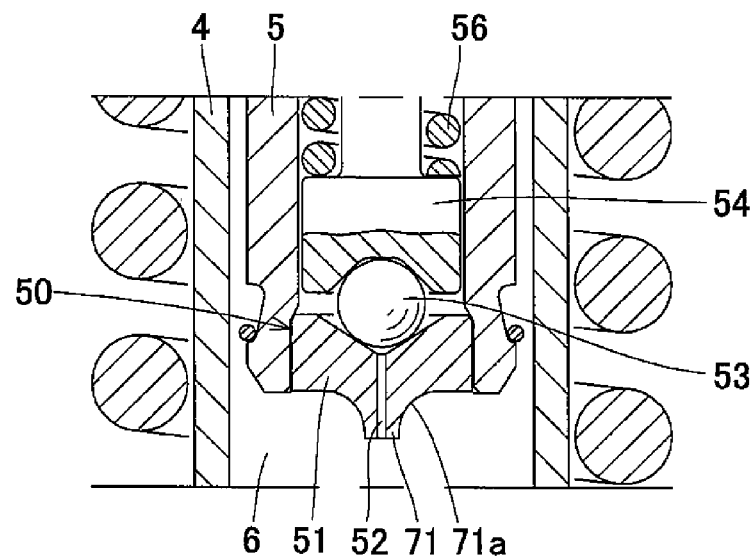
FIG. 17 is a longitudinal sectional view of still another embodiment of a hydraulic auto-tensioner for use with an engine accessory according to the present invention.

FIGS. 16 and 17 show still different hydraulic auto-tensioners for use with an engine accessory embodying the present invention. The hydraulic auto-tensioner shown in FIG. 16 differs from the auto-tensioner of FIG. 13 in that a tapered surface 70 is formed on the lower surface of the valve seat 51, which faces the pressure chamber 6, so as to incline upwardly from the middle of the lower surface toward the outer circumference thereof, and that the filter 60 is omitted. Thus, the elements identical to those shown in FIG. 13 are denoted by identical reference numerals, and the description thereof will be omitted.

By forming the tapered surface 70 on the lower surface of the valve seat 51, if the relief valve 50 opens and hydraulic oil flows through the valve hole 52 formed in the valve seat 51 into the relief valve 50, foreign substances mixed in the hydraulic oil are guided by the tapered surface 70 and easily flows toward the outer circumference of the valve seat 51.

Thus, foreign substances are less likely to enter the valve hole 52, which in turn reduces the possibility of a failure of the relief valve 50 due to entry of foreign substances.

The auto-tensioner shown in FIG. 17 differs from the auto-tensioner of FIG. 13 in that a narrow protrusion 71 having a truncated cone shape is formed on the center of the lower surface of the valve seat 51, which faces the pressure chamber 6, an arcuate surface 71a is provided at the root of the narrow protrusion 71, and the filter 60 is omitted. Thus, the elements identical to those shown in FIG. 13 are denoted by identical reference numerals, and the description thereof will be omitted.

In the auto-tensioner shown in FIG. 17 as well, if the relief valve 50 opens and hydraulic oil flows through the valve hole 52 formed in the valve seat 51 into the relief valve 50, foreign substances mixed in the hydraulic oil easily flow toward the outer circumference of the valve seat 51 along the tapered surface on the outer periphery of the narrow protrusion 71, and the arcuate surface 71a. Similar to the case shown in FIG. 16, foreign substances are thus less likely to enter the valve hole 52, which in turn reduces the possibility of a failure of the relief valve 50 due to entry of foreign substances.

In FIGS. 13, 16, and 17, a cylindrical coil spring is shown for the valve spring 56 of the relief valve 50, but the valve spring 56 is not limited to a cylindrical coil spring. FIGS. 18 to 22 show different valve springs 56.

Figure 18:
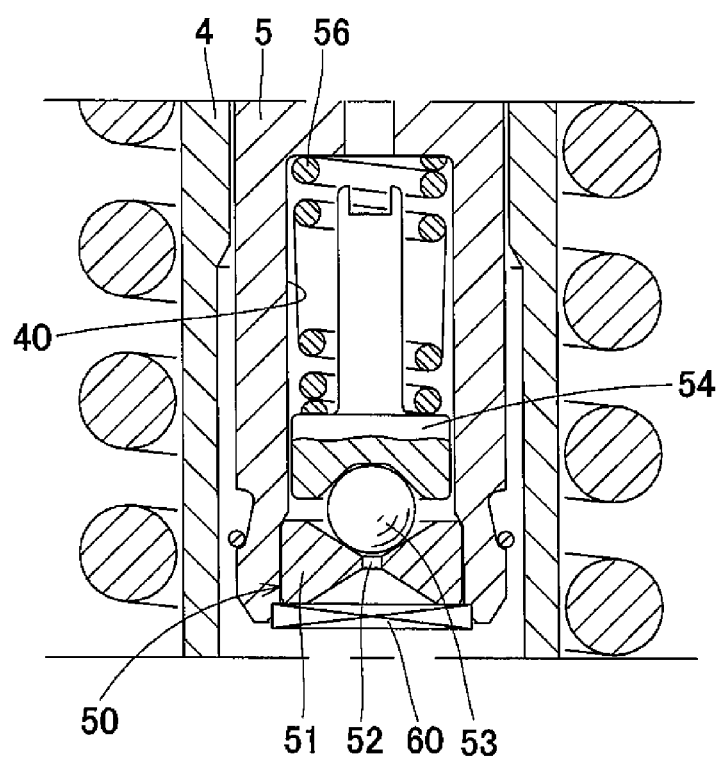
FIG. 18 is a sectional view showing another example of a relief valve.

In FIG. 18, a conical coil spring is adopted for the valve spring 56, which spring presses the spring seat 54 downward with the small diameter end thereof.

Figure 19:
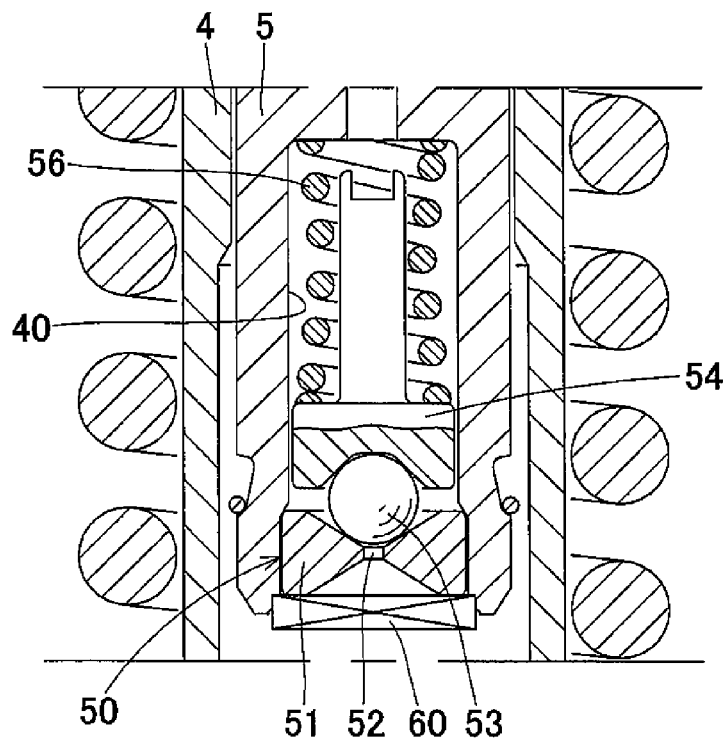
FIG. 19 is a sectional view showing still another example of a relief valve.
Figure 20:
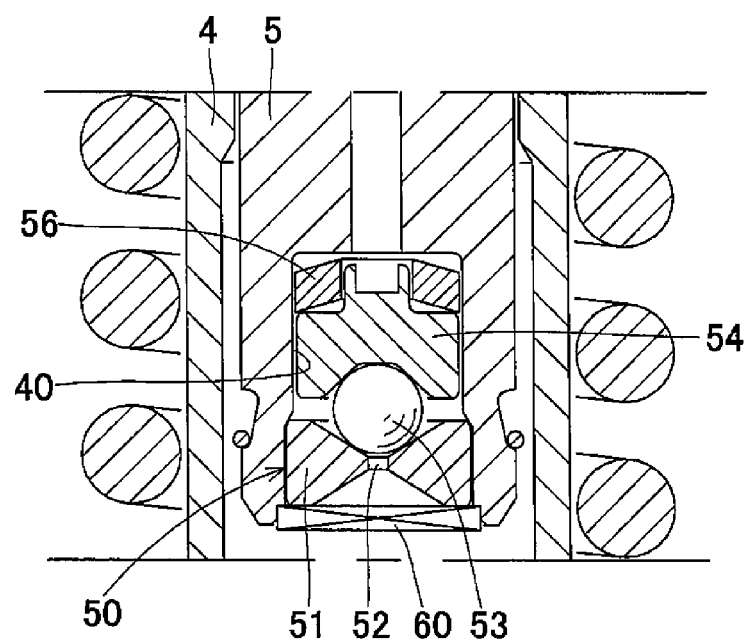
FIG. 20 is a sectional view showing yet another example of a relief valve.

The valve spring 56 shown in FIG. 19 comprises an hourglass-shaped coil spring, of which the diameter is small at its central part in the length direction and increases toward both ends. In FIG. 20, a disc spring is adopted for the valve spring 56 in FIG. 20. A diaphragm-shaped spring may be adopted in place of the disc spring.

Figure 21:
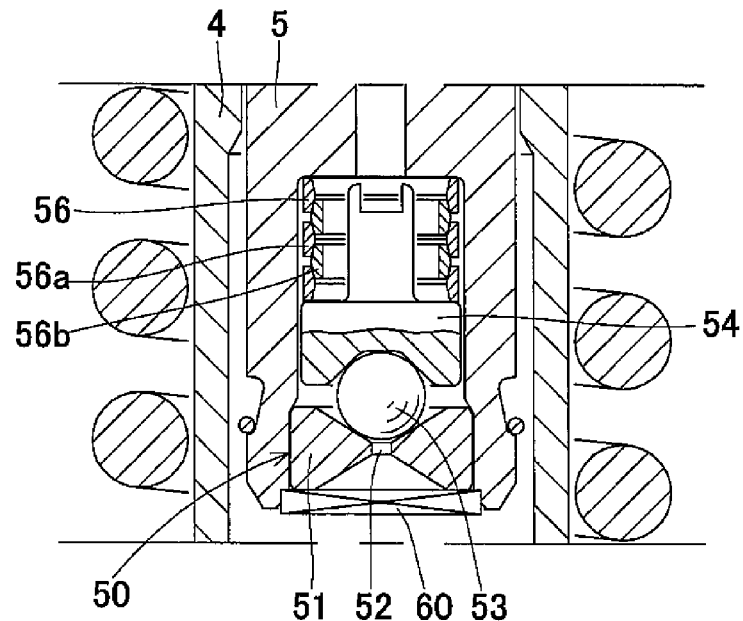
FIG. 21 is a sectional view showing still another example of a relief valve.
Figure 22:
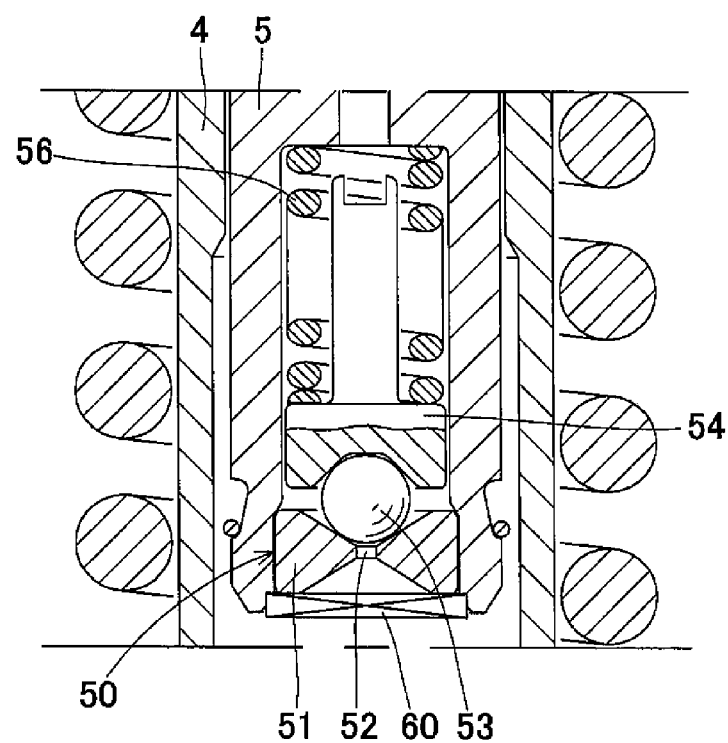
FIG. 22 is a sectional view showing a further example of a relief valve.

The valve spring shown in FIG. 21 comprises a ring spring including outer rings 56a each having tapered surfaces on the inner periphery thereof, and inner rings 56b each having tapered surfaces on the outer periphery thereof and arranged alternately with the outer rings 56a. The valve spring of FIG. 22 is a cylindrical coil spring formed of a spring wire having an elliptical cross-sectional shape.

Since all the valve springs 56 shown in FIGS. 18 to 22 have a large spring constant compared to a cylindrical coil spring, the size in the length direction of the valve spring 56 can be reduced and the relief valve 50 can be miniaturized. This makes it possible to reduce the axial length of the space in which the relief valve 50 is mounted, which in turn makes it easier to form a hole in the rod 5.

DESCRIPTION OF SYMBOLS 1 cylinder
3 sleeve fit-in hole
3a divided bottom surface
3b divided inner peripheral surface
4 sleeve
5 rod
6 pressure chamber
7 spring washer
8 return spring
11 spring cover
13 oil seal (seal member)
14 reservoir chamber
15 oil passage
17 check valve
18 valve seat
28 washer
29 pocket
30, 60 filter
50 relief valve
51 valve seat
52 valve hole
53 valve body
56 valve spring
70 tapered surface
71 sharp portion
71a arcuate surface

The invention claimed is:

1. A hydraulic auto-tensioner for use with an engine accessory, comprising:
a cylinder containing hydraulic oil and including a bottom portion having an upper surface formed with a sleeve fit-in hole;
a sleeve having a lower end portion press-fitted in the sleeve fit-in hole;
a rod having a lower end portion slidably inserted in the sleeve and defining a pressure chamber in the sleeve;
a return spring incorporated between a spring washer provided at an upper part of the rod and the upper surface of the bottom portion of the cylinder and biasing the cylinder and the rod in a direction in which the rod protrudes from the cylinder;
a tubular spring cover provided on the spring washer and covering an upper part of the return spring;
a seal member incorporated in an upper side opening of the cylinder and having an inner periphery kept in elastic contact with an outer periphery of the spring cover, thereby defining a reservoir chamber between the cylinder and the sleeve, an oil passage being defined between fitting surfaces of the sleeve and the sleeve fit-in hole such that the reservoir chamber communicates with the pressure chamber through the oil passage; and
a check valve mounted in the lower end portion of the sleeve and configured to be closed, thereby disconnecting the pressure chamber from the oil passage, when a pressure in the pressure chamber becomes higher than a pressure in the reservoir chamber,
wherein the sleeve has a lower end face in abutment with a bottom surface of the sleeve fit-in hole, the bottom surface of the sleeve fit-in hole having:
an annular inner peripheral surface portion;
an annular outer peripheral surface portion surrounding the annular inner peripheral surface portion and located at a higher level than the annular inner peripheral surface portion; and
an oil sump surrounded by the annular inner peripheral surface portion.

2. The hydraulic auto-tensioner for use with an engine accessory according to claim 1, wherein the lower end face of the sleeve is in abutment with the annular outer peripheral surface portion of the bottom surface.

3. The hydraulic auto-tensioner for use with an engine accessory according to claim 2, wherein the bottom surface is stepped by placing an annular washer having a rectangular cross-section on the bottom surface.

4. The hydraulic auto-tensioner for use with an engine accessory according to claim 3, wherein the lower end face of the sleeve is in abutment with the annular outer peripheral surface portion, and wherein the check valve includes a valve seat arranged such that a downward movement of the valve seat is restricted by the annular inner peripheral surface portion.

5. The hydraulic auto-tensioner for use with an engine accessory according to claim 2, wherein the lower end face of the sleeve is in abutment with the annular outer peripheral surface portion, and wherein the check valve includes a valve seat arranged such that a downward movement of the valve seat is restricted by the annular inner peripheral surface portion.

6. The hydraulic auto-tensioner for the auxiliary device according to claim 1, wherein the check valve includes a valve seat having a lower surface located at a higher level than the lower end face of the sleeve, and each of the annular outer peripheral surface portion and the annular inner peripheral surface portion of the bottom surface of the sleeve fit-in hole is a flat surface portion.

7. The hydraulic auto-tensioner for an engine accessory according to claim 6, wherein the at least one oil passage comprises a plurality of radially extending oil passages, the bottom surface and an inner peripheral surface of the sleeve fit-in hole are divided into a plurality of circumferentially separate bottom surface portions and a plurality of circumferentially separate inner peripheral surface portions, respectively, by the plurality of oil passages, and a pocket having an arc shape in plan view is formed in each of the bottom surface portions.

8. The hydraulic auto-tensioner for use with an engine accessory according to claim 7, wherein a circumferential width of each of the inner peripheral surface portions is smaller than a circumferential width of an outer peripheral portion of a corresponding one of the pockets.

9. The hydraulic auto-tensioner for use with an engine accessory according to claim 1, wherein the cylinder is a die casting molded article made of aluminum alloy or an aluminum forged article.

10. The hydraulic auto-tensioner for use with an engine accessory according to claim 9, wherein the die casting molded article is formed by a pore free pressure die casting.

11. The hydraulic auto-tensioner for use with an engine accessory according to claim 1, wherein a filter is provided on a hydraulic oil flow-in side of a valve hole formed in the check valve, and is configured to capture foreign substances mixed in hydraulic oil flowing into the valve hole and prevent the foreign substances from flowing into the pressure chamber.

12. The hydraulic auto-tensioner for use with an engine accessory according to claim 11, wherein the filter is a net having a mesh size of 0.1 mm to 0.2 mm.

13. The hydraulic auto-tensioner for use with an engine accessory according to claim 11, wherein the filter is made of a porous metal having a porosity of 90 to 97%.

14. The hydraulic auto-tensioner for use with an engine accessory according to claim 1, wherein the rod includes a valve fit-in hole opened at a lower end face thereof, and an oil path through which an upper part of the valve fit-in hole communicates with the reservoir chamber;
a relief valve is incorporated in the valve fit-in hole, the relief valve including a valve seat formed with a valve hole, a valve body configured to open and close the valve hole from an upper surface side of the valve seat, and a valve spring that biases the valve body toward the valve seat; and
a filter is provided on a hydraulic oil flow-in side of the relief valve, and configured to capture foreign substances mixed in hydraulic oil, thereby preventing entry of the foreign substances into the relief valve.

15. The hydraulic auto-tensioner for use with an engine accessory according to claim 14, wherein the valve spring is one of a conical coil spring arranged such that a small-diameter end of the coil spring faces the valve body of the relief valve, an hourglass-shaped coil spring of which a diameter is small at a longitudinal center thereof and increases toward two respective ends thereof, a disc spring, and a cylindrical coil spring formed of a spring wire having an elliptical cross-sectional shape.

16. The hydraulic auto-tensioner for use with an engine accessory according to claim 1, wherein
the rod includes a valve fit-in hole opened at a lower end face thereof, and an oil path through which an upper part of the valve fit-in hole communicates with the reservoir chamber;
a relief valve is incorporated in the valve fit-in hole, the relief valve including a valve seat with a valve hole, a valve body configured to open and close the valve hole from an upper surface side of the valve seat, and a valve spring that biases the valve body toward the valve seat; and
a tapered surface is formed on a lower surface of the valve seat facing the pressure chamber so as to upwardly incline from a central portion toward an outer peripheral portion, of the lower surface of the valve seat, or a truncated conical narrow protrusion is formed on the central portion, the narrow protrusion including a root portion having a circular arc-shaped surface.

17. The hydraulic auto-tensioner for use with an engine accessory according to claim 1, wherein the lower end face of the sleeve is in abutment with the annular outer peripheral surface portion, and wherein the check valve includes a valve seat arranged such that a downward movement of the valve seat is restricted by the annular inner peripheral surface portion.

18. A hydraulic auto-tensioner for use with an engine accessory, comprising:
a cylinder containing hydraulic oil and including a bottom portion having an upper surface formed with a sleeve fit-in hole having a flat bottom surface;
a sleeve having a lower end portion press-fitted in the sleeve fit-in hole;
a rod having a lower end portion slidably inserted in the sleeve and defining a pressure chamber in the sleeve;
a return spring incorporated between a spring washer provided at an upper part of the rod and the upper surface of the bottom portion of the cylinder and biasing the cylinder and the rod in a direction in which the rod protrudes from the cylinder;
a tubular spring cover provided on the spring washer and covering an upper part of the return spring;
a seal member incorporated in an upper side opening of the cylinder and having an inner periphery kept in elastic contact with an outer periphery of the spring cover, thereby defining a reservoir chamber between the cylinder and the sleeve, an oil passage being defined between fitting surfaces of the sleeve and the sleeve fit-in hole such that the reservoir chamber communicates with the pressure chamber through the oil passage;
a check valve mounted in the lower end portion of the sleeve, the check valve configured to be closed, thereby disconnecting the pressure chamber from the oil passage, when a pressure in the pressure chamber becomes higher than a pressure in the reservoir chamber; and
an annular washer on an outer peripheral portion of the bottom surface of the sleeve fit-in hole to form a step, a lower end face of the sleeve abutting a top surface of the step formed by the annular washer, a lower surface of a valve seat of the check valve abutting an inner peripheral portion of the bottom surface.

* * * * *